United States Patent
Willoughby et al.

(10) Patent No.: US 11,768,741 B2
(45) Date of Patent: Sep. 26, 2023

(54) REPLICATING CHANGES WRITTEN BY A TRANSACTIONAL VIRTUAL STORAGE ACCESS METHOD

(71) Applicant: International Business Machines Corporation, Armonk, NY (US)

(72) Inventors: Austin Willoughby, Voorheesville, NY (US); Roity Prieto Perez, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 17/444,064

(22) Filed: Jul. 30, 2021

(65) Prior Publication Data
US 2023/0043307 A1 Feb. 9, 2023

(51) Int. Cl.
G06F 11/00 (2006.01)
G06F 11/14 (2006.01)
G06F 13/16 (2006.01)
G06F 16/23 (2019.01)

(52) U.S. Cl.
CPC ...... G06F 11/1469 (2013.01); G06F 13/1668 (2013.01); G06F 16/2358 (2019.01); *G06F 2201/82* (2013.01)

(58) Field of Classification Search
CPC ............ G06F 11/1469; G06F 16/2358; G06F 13/1668; G06F 2201/82
See application file for complete search history.

(56) References Cited

U.S. PATENT DOCUMENTS

| 5,596,710 | A  | * | 1/1997  | Voigt ................. | G06F 11/1474 714/E11.13 |
| 6,434,710 | B1 | * | 8/2002  | Sato .................... | G06F 11/1474 712/228 |
| 6,944,635 | B2 | * | 9/2005  | Kim .................... | G06F 11/1435 |
| 7,290,056 | B1 | * | 10/2007 | McLaughlin, Jr. ..... | H04L 67/02 709/201 |
| 8,442,962 | B2 | * | 5/2013  | Lee ........................ | G06F 9/466 707/703 |

(Continued)

FOREIGN PATENT DOCUMENTS

EP  3167372 B1  10/2018

OTHER PUBLICATIONS

IBM Corporation, "LGGF—General Log Format," IBM Documentation, accessed Jul. 29, 2021, 6 pages. https://www.ibm.com/docs/en/cics-ts/5.6?topic=areas-lggf-general-log-format.

(Continued)

*Primary Examiner* — Loan L. T. Truong
(74) *Attorney, Agent, or Firm* — Yee & Associates, P.C.

(57) ABSTRACT

Selectively committing or rolling-back in-flight units of recovery is provided. An indicator is read in a transaction identifier information record corresponding to a unit of recovery that is in-flight. It is determined whether the indicator indicates a commit for the unit of recovery that is in-flight. In response determining that the indicator does indicate the commit for the unit of recovery that is in-flight, the unit of recovery that is in-flight corresponding to the transaction identifier information record is committed to form a committed unit of recovery. The committed unit of recovery corresponding to the transaction identifier information record is sent to a target system for further processing.

20 Claims, 7 Drawing Sheets

(56) References Cited

U.S. PATENT DOCUMENTS

| | | | |
|---|---|---|---|
| 8,825,743 | B2 | 9/2014 | Gehrke et al. |
| 8,868,506 | B1 * | 10/2014 | Bhargava ............ G06F 16/1774 |
| | | | 707/648 |
| 8,880,480 | B2 | 11/2014 | Kundu et al. |
| 9,323,750 | B2 | 4/2016 | Natanzon et al. |
| 9,418,135 | B2 | 8/2016 | Kreuder et al. |
| 9,858,151 | B1 * | 1/2018 | Dillenberger ........... G06F 11/14 |
| 10,191,932 | B2 | 1/2019 | Lehouillier et al. |
| 10,229,010 | B2 | 3/2019 | CaraDonna et al. |
| 10,747,606 | B1 * | 8/2020 | Shemer ................. G06F 11/079 |
| 11,150,964 | B1 * | 10/2021 | Haberkorn .......... G06F 16/1734 |
| 11,176,558 | B1 * | 11/2021 | Cohn .................... G06Q 20/102 |
| 11,372,734 | B1 * | 6/2022 | Zhang ................. G06F 11/1471 |
| 11,481,385 | B1 * | 10/2022 | Webber ................. G06F 16/287 |
| 2002/0174108 | A1 * | 11/2002 | Cotner ..................... G06F 16/27 |
| | | | 714/E11.131 |
| 2003/0191735 | A1 * | 10/2003 | Gormley ................. G06F 16/10 |
| 2005/0192962 | A1 * | 9/2005 | Furrer .................... G06F 16/972 |
| 2006/0167999 | A1 | 7/2006 | Clark et al. |
| 2007/0124342 | A1 * | 5/2007 | Yamamoto .............. G06F 9/466 |
| 2007/0143299 | A1 * | 6/2007 | Huras ..................... G06F 9/466 |
| 2008/0046400 | A1 * | 2/2008 | Shi ....................... H04L 67/1001 |
| | | | 707/E17.046 |
| 2009/0193280 | A1 * | 7/2009 | Brooks ............... G06F 11/1474 |
| | | | 713/400 |
| 2013/0091391 | A1 * | 4/2013 | Arndt .................. G06F 11/0754 |
| | | | 714/47.1 |
| 2014/0337393 | A1 * | 11/2014 | Burchall ............. G06F 16/2379 |
| | | | 707/826 |
| 2016/0062836 | A1 * | 3/2016 | Mu ..................... G06F 11/2058 |
| | | | 714/6.23 |
| 2016/0098331 | A1 | 4/2016 | Banka et al. |
| 2016/0378338 | A1 * | 12/2016 | Khandelwal ............ G06F 3/065 |
| | | | 711/154 |
| 2017/0212846 | A1 * | 7/2017 | Menendez ................ G06F 9/52 |
| 2019/0138624 | A1 * | 5/2019 | Menendez .......... G06F 16/1774 |
| 2019/0340278 | A1 * | 11/2019 | Bensberg .............. G06F 16/164 |
| 2020/0026440 | A1 * | 1/2020 | Killamsetti ........... G06F 3/0619 |
| 2020/0043355 | A1 * | 2/2020 | Kwatra .............. G06Q 10/0633 |
| 2021/0056120 | A1 * | 2/2021 | Willoughby ............ G06F 16/27 |
| 2022/0107956 | A1 * | 4/2022 | Krishna .................. G06F 16/27 |

OTHER PUBLICATIONS

IBM Corporation, "FCLGC—File Control Log Record Format" IBM Documentation, accessed Jul. 29, 2021, 9 pages. https://www.ibm.com/docs/en/cics-ts/5.6?topic=areas-folgc-file-control-log-record-format.

* cited by examiner

REPLICATING CHANGES WRITTEN BY A TRANSACTIONAL VIRTUAL STORAGE ACCESS METHOD

BACKGROUND

1. Field

The disclosure relates generally to data replication and more specifically to replicating changes to transaction data written by a transactional Virtual Storage Access Method using a unique transaction identifier information record, which includes an identifier of an in-flight unit of recovery corresponding to a group of transaction data changes, to selectively commit or rollback the group of transaction data changes of the in-flight unit of recovery based on a commit/rollback flag contained in the unique transaction identifier information record.

2. Description of the Related Art

Data replication is the process of replicating data and storing the replicated data in a set of one or more targets, such as different nodes, databases, or sites. Data replication is often utilized for high data availability, but might also be leveraged with heterogeneous targets for analytics, integration projects, or making data available in a cloud environment. For business-critical systems, data replication is a best practice to mitigate impact due to server failure, system hardware-related issues, or the like. For example, if a primary database becomes unavailable due to a non-recoverable error, then the replicated data on a secondary database will be useful for continuation of business operations.

Virtual Storage Access Method (VSAM) applies to both a set of dataset types and the access method used to manage various dataset types. As an access method, VSAM provides more complex functions than other disk access methods. VSAM keeps disk records in a unique format that is not understandable by other access methods. VSAM is a direct-access storage device file storage access method. A direct-access storage device is a secondary storage device in which each physical record has a discrete location and a unique address.

VSAM is a high-performance access method, which organizes and maintains data in datasets or files. VSAM record level sharing provides for the sharing of VSAM data at the record level. Transactional VSAM provides transactional recovery directly in VSAM. Transactional VSAM supports those datasets that are defined as recoverable. In other words, the log attribute for a respective dataset in transactional VSAM is either UNDO (rollback logging only) or ALL (rollback and forward recovery logging). When a batch job opens a recoverable dataset for update, the open is done in transactional VSAM mode. This allows transactional VSAM to provide the necessary transactional recovery for the dataset.

SUMMARY

According to one illustrative embodiment, a computer-implemented method for selectively committing or rolling-back in-flight units of recovery is provided. A computer reads an indicator in a transaction identifier information record corresponding to a unit of recovery that is in-flight. The computer determines whether the indicator indicates a commit for the unit of recovery that is in-flight. In response to the computer determining that the indicator does indicate the commit for the unit of recovery that is in-flight, the computer commits the unit of recovery that is in-flight corresponding to the transaction identifier information record to form a committed unit of recovery. The computer sends the committed unit of recovery corresponding to the transaction identifier information record to a target system for further processing. According to other illustrative embodiments, a computer system and computer program product for selectively committing or rolling-back in-flight units of recovery are provided.

DETAILED DESCRIPTION

Figure 1:
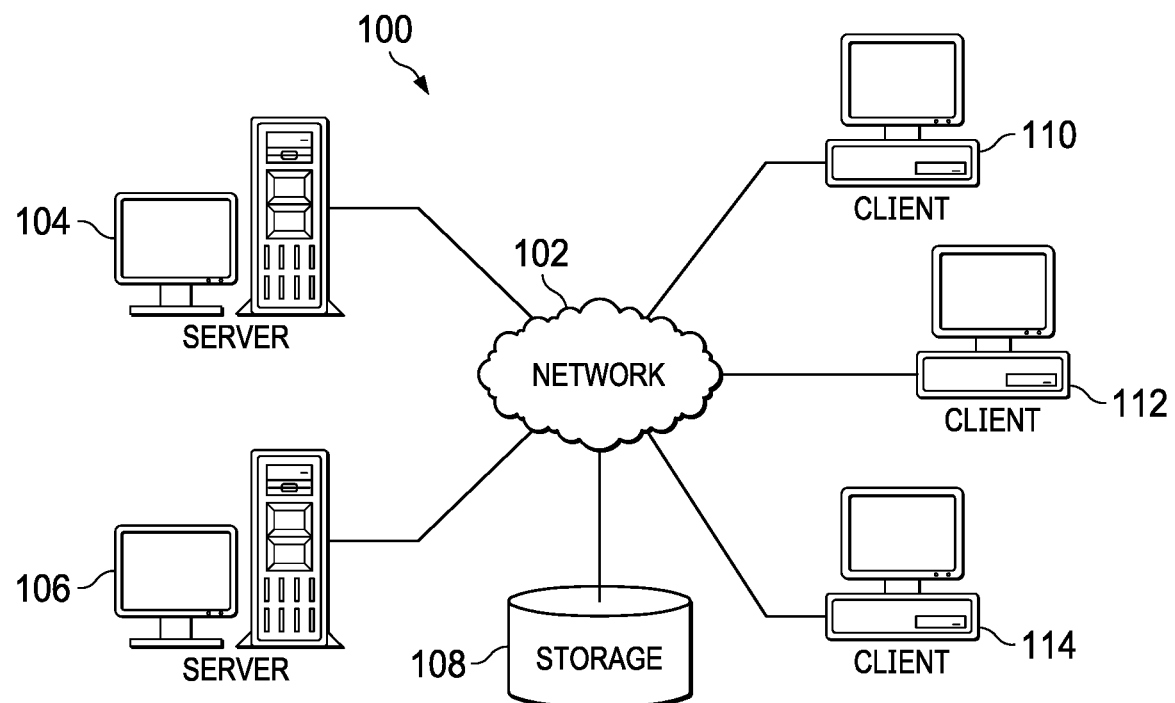
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
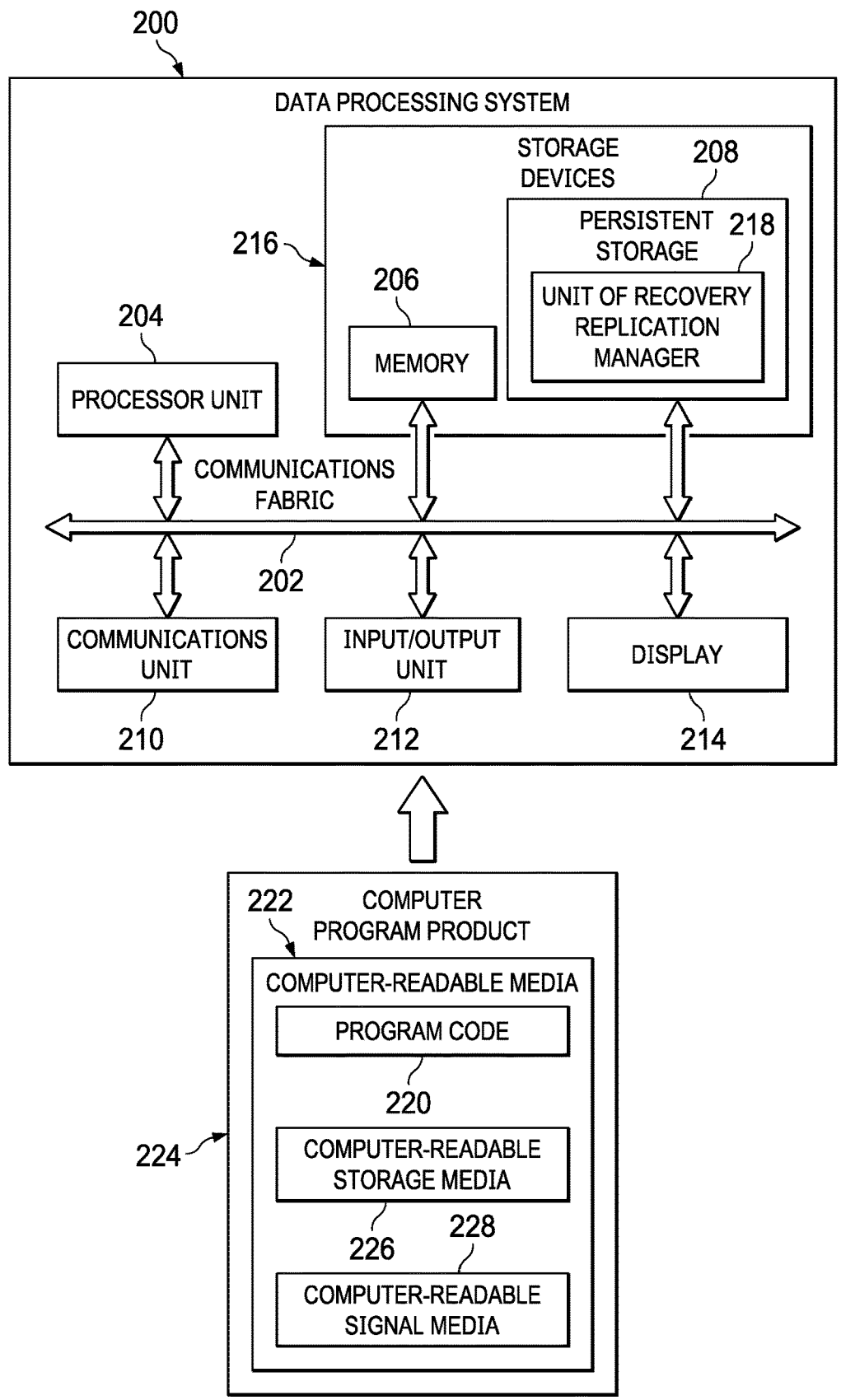
FIG. 2 is a diagram of a data processing system in which illustrative embodiments may be implemented.
Figure 3:
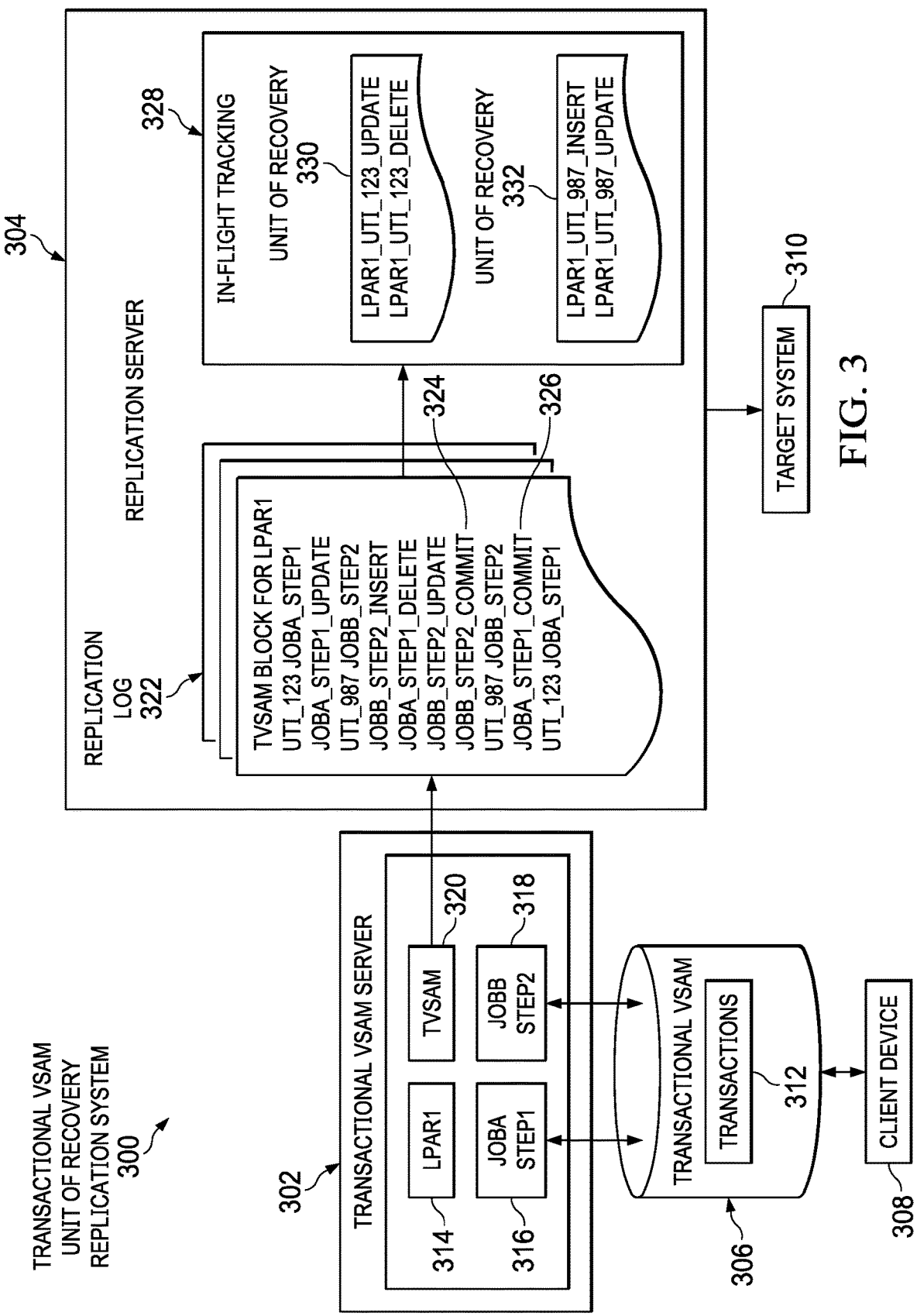
FIG. 3 a diagram illustrating an example of a transactional VSAM unit of recovery replication system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 may be, for example, a transactional VSAM server that manages transactions by identifying units of recovery corresponding to related groups of transaction data changes implemented by client device users in a transactional VSAM and sending the identified units of recovery to a replication log for processing by a replication server. A transaction change may be, for example, an insert, update, or delete operation corresponding to a transaction. Server 106 may be, for example, a replication server that replicates the transaction data changes using unique transaction identifier information records, which include identifiers of in-flight units of recovery corresponding to different groups of transaction data changes, to selectively commit or rollback the different groups of transaction data changes of the in-flight units of recovery based on commit/rollback flags contained in corresponding unique transaction identifier information records. However, it should be noted that transactional VSAM and replication can run on the same server. In other words, in an alternative illustrative embodiment, each of server 104 and server 106 can perform both transactional VSAM and replication.

Storage 108 is a network storage device capable of storing any type of data in a structured format or an unstructured format. In addition, storage 108 may represent a plurality of network storage devices. Further, storage 108 may be, for example, a set of data accessed using transactional VSAM. The set of data contains transaction data for one or more entities. A transactional VSAM allows client device users to view and modify the transaction data (e.g., add, change, or delete data). A client device user may be a human user or a software application. Transaction data are information regarding online transactions or events corresponding to an entity, such as, for example, an enterprise, company, business, organization, institution, agency, or the like. A transaction may be, for example, transferring money online from one bank account to another bank account, performing an online purchase of an item, making a stock trade, signing up for a class, filing a form, or the like.

Further, storage 108 may store identifiers and network addresses for a plurality of client devices, identifiers for a plurality of client device users, and the like. Furthermore, storage 108 may store other types of data, such as authentication or credential data that may include usernames, passwords, and the like associated with client device users, for example.

Client 110, client 112, and client 114 also connect to network 102. Clients 110, 112, and 114 are clients of storage 108. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart vehicles, smart appliances, gaming devices, kiosks, and the like, with wire or wireless communication links to network 102. Users of clients 110, 112, and 114 may utilize clients 110, 112, and 114 to make transaction data changes on storage 108.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to storage 108 over network 102 for use on storage 108.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 106 in FIG. 1, in which computer-readable program code or instructions implementing the in-flight unit of recovery replication processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores unit of recovery replication manager 218. However, it should be noted that even though unit of recovery replication manager 218 is illustrated as residing in persistent storage 208, in an alternative illustrative embodiment unit of recovery replication manager 218 may be a separate component of data processing system 200. For example, unit of recovery replication manager 218 may be a hardware component coupled to communication fabric 202 or a combination of hardware and software components. In another alternative illustrative embodiment, a first set of components of unit of recovery replication manager 218 may be located in data processing system 200 and a second set of components of unit of recovery replication manager 218 may be located in a second data processing system, such as, for example, server 104 in FIG. 1.

Unit of recovery replication manager 218 controls the process of replicating changes to transaction data written by a transactional VSAM using a unique transaction identifier information record, which includes an identifier of an in-flight unit of recovery corresponding to a group of transaction data changes, to selectively commit or rollback the group of transaction data changes of the in-flight unit of recovery based on a commit/rollback flag in the unique transaction identifier information record. As a result, data processing system 200 operates as a special purpose computer system in which unit of recovery replication manager 218 in data processing system 200 enables selective replication of in-flight units of recovery. In particular, unit of recovery replication manager 218 transforms data processing system 200 into a special purpose computer system as compared to currently available general computer systems that do not have unit of recovery replication manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Transactional VSAM has differences from a transaction management server that present challenges for tracking units of recovery for recoverable changes in a replication system using the existing log record format for the transactional VSAM and the transaction management server. The transaction management server may be, for example, a Customer Information Control System (CICS®) transaction server. CICS is a registered trademark of International Business Machines Corporation of Armonk, NY The existing log record format is externally defined and used by forward recovery and replication log readers for forward recovery and replication purposes.

The transactional VSAM supports datasets that are defined as recoverable. In other words, a log attribute for a particular dataset is either UNDO (i.e., rollback logging only) or ALL (i.e., rollback and forward recovery logging). A transaction is a unit of processing initiated by a single request that may affect one or more data records. Replication of data records is for recovery during system failures and for other purposes, such as data analytics, data warehousing, event driven processing, cloud availability, data migration, and the like. System failures may include, for example, application crashes, hardware errors, power failures, and the like. The transactional VSAM records all data record changes made by, for example, a human user, an application, or the like, in a replication log.

For a transactional VSAM recoverable dataset, replication requires replication log records be written with enough identifying information to combine the discrete changes into a unit of recovery so the unit of recovery can be committed or rolled back with atomicity. This means the changes for the unit of recovery must be identifiable in the replication log records so that the changes can be combined or rolled-back as needed. In addition, the changes for the unit of recovery must be uniquely identifiable from changes for other units of recovery.

The set of transaction changes processed by a single commit or rollback (e.g., backout) is called a unit of recovery. A unit of recovery is an indivisible (atomic) set of transaction changes that permits data consistency to be maintained. In other words, a set of changes for a single unit of recovery occurs atomically. Atomic operations are those that execute in the same manner as machine instructions (e.g., either all the changes are made, or none are made). The point at which the set of changes becomes permanent is called a commit or a synchronization point. If for some reason the set of changes are not to be made (e.g., an error occurs), then the changes are rolled-back and deleted.

A transaction management server provides an increasing task identifier for each unit of work. Each unit of work can be identified in the replication log records using a transaction management server address space name (e.g., application identifier) and sequential task identifier as the replication log records are read with synchronization point records indicating whether the changes in the unit of recovery built since the last synchronization point should be committed and processed by a replication server or rolled-back and discarded by the replication server. The task identifier restarts when the transaction management server region (e.g., address space) is restarted. Each transaction management server task has one unit of work outstanding at a time.

In contrast, transactional VSAM logs a job name and partial step name (e.g., first 4 bytes) and these values can be reused immediately after the job ends and may even be reused while running when reuse job name is coded. If the job abends (i.e., abnormal ends) or otherwise leaves work stranded, the unit of recovery will be shunted until its final disposition (e.g., commit or rollback) can be assigned. This could take minutes or longer. The replication system should hold this unit of recovery in storage as "in-flight", but also needs to process other units of recovery started by the same job name that are not impacted by the unit of recovery that remains in-flight. As used herein, in-flight means that the unit of recovery does not currently have a final disposition (i.e., commit or rollback).

One transactional VSAM name exists per logical partition for many job names making uniqueness more of an issue than with units of recovery originating from the transaction management server where there may be many transaction management server regions per logical partition that each log independently. Thus, a solution is needed for this lack of uniqueness to track transactional VSAM units of recovery in a replication system.

Illustrative embodiments provide uniqueness to track transactional VSAM units of recovery without changing existing replication log record formats. In other words, illustrative embodiments are capable of utilizing existing replication log record formats. In addition, illustrative embodiments do not interfere with VSAM recovery processing for forward recovery by utilizing existing replication log record formats. Further, illustrative embodiments avoid logging multiple images for replication and forward recovery by using flags or bits to indicate that the image applies to both replication and forward recovery. Furthermore, illustrative embodiments avoid requirements on ordering logical records in a block of records, which includes contiguous records or multiple records occurring in the same block of records.

The transactional VSAM of illustrative embodiments writes a new unique transaction identifier information record, which includes a unique unit of recovery identifier for each transaction, to the replication log before the first change is logged for a particular transaction. A replication server can use this new unique transaction identifier information record to, for example: 1) relate transaction change records to a particular unit of recovery since the new unique transaction identifier information record correlates the job name, step, and task control block address to the unique unit of recovery identifier; 2) track in-flight units of recovery that correspond to unit of recovery identifiers that do not have a final disposition; and 3) commit or rollback a shunted unit of recovery either during normal processing or following final disposition.

Existing forward recovery and replication log readers ignore new record types that they do not support. In addition, existing forward recovery utilities ignore replication log records when the File Log and Journal Block (FLJB) replication is set and the FLJB forward recovery is not set.

Illustrative embodiments log the new unique transaction identifier in a format, such as, for example, record identifier, task control block address, unique unit of recovery identifier, and the like. The record identifier may be, for example, 0xFA. The task control block address may be, for example, 24-bits requiring 3 bytes to represent. The task control block address may be, for example, stored in the last 3 bytes of a general log data's journal field, which currently is a meaningless part of a record for the transactional VSAM. The task control block allows all transactional VSAM records to be uniquely correlated with an identifier of a unit of recovery information record. A unit of recovery identifier may be, for example, 0xD7ACB3F07E3BF00000000002010110000.

Adding the task control block address to the general log data's journal field of all transactional VSAM-logged records allows the replication server to process multiple identify the transactional VSAM unit of recovery using the unit of recovery identifier from the resource recovery service in some manner.

The transactional VSAM also writes the new unique transaction identifier information record, which includes the unit of recovery identifier (UORID) from the resource recovery service, to the replication log during synchronization point processing in order for the replication server to know precisely which in-flight units of recovery should be committed or rolled-back. For example, the transactional VSAM may set Flag2 bits, which are shown below, reflecting either commit or rollback.

```
                                          00000059 *                                  ....*
00000038 0000000C D7A9CD18 89E7FFFF D7A96F37 F227FFFF E5C1D3D2 D9E3D3F3 *........P....X. P.?.2.. VALKRTL3*
E5E2C1D2 0002E3E5 40404040 40123456 00000000 FA020000 00000000 00000000 *VSAK..TV ............................*
01408000 00000010 D7ACB3F0 7E3BF000 00000002 01010000
|  |  |  |   |  |
|  |  |  |   |  UORID
|  |  |  |   UORID len
|  |  |  Flag2 bits for commit, rollback
|  |  Flag bits for one byte (start UOR, end UOR (synchronization point))
|  Version
``` units of recovery from the same job name and step (i.e., multiple task control blocks within the same address space). One active unit of recovery exists at a time per task control block for the transactional VSAM. The transactional VSAM adds the task control block address to the read-update, write-update, write-add, and delete general log data's journal field.

The replication server groups new transaction changes with the unit of recovery identifier established by the last matching unit of recovery identifier information record the replication server received. If a unit of recovery is shunted (e.g., a source task control block abended) and no commit or rollback for the logical partition (LPAR), job name, step, and task control block address has occurred, then that particular unit of recovery, which was shunted, remains in-flight in the replication server. The replication server may receive a new unit of recovery identifier information record for the same LPAR, job name, step, and task control block address. The new unit of recovery identifier information record begins a new unit of recovery for future transaction changes received from that particular LPAR, job name, step, and task control block address combination. The previously shunted unit of recovery remains in-flight in the replication server. In other words, the older transaction identifier information remains in-flight indefinitely until its unique commit/rollback information is received.

The replication server tracks transactional VSAM units of recovery as, for example, uuuuuuuuuuuuuuuu.GWTV001sssssss, where "u" represents the unit of recovery identifier from a resource recovery service (i.e., a unique transaction identifier information record), the next 8 bits represent a transactional VSAM server name, and "s" represents a time-of-day value (e.g., timestamp), which is used by the replication server to make the unit of recovery unique in the replication path. However, illustrative embodiments may reorganize the "u" value to achieve better key distribution in the replication cache since the first portion is a time-of-day value that tends not to vary much. For example, the first two values of the unit of recovery identifier may be swapped in the internal replication representation. However, the point remains that the replication server can use this information to uniquely It should be noted that the replication server will not use the transactional VSAM 0x87, 0x88 commit, rollback records to determine final disposition of the transactional VSAM units of recovery. However, it should be noted that the transactional VSAM may still write these 0x87, 0x88 commit, rollback records in situations where a particular entity (e.g., a vendor) may expect them. By ignoring the 0x87, 0x88 commit, rollback records, the replication server does not have to correlate the 0x87, 0x88 commit, rollback records to the transaction changes the 0x87, 0x88 commit, rollback records impact. Instead, the replication server can do all synchronization point processing using the unique transaction identifier information record. For example, no information exists on the 0x87, 0x88 commit, rollback records that is not included in the new unique transaction identifier information record. This also means that the transactional VSAM does not have to consider suspends or other issues that might cause records to be separated in the replication log or trying to add code to write one physical block record containing two logical records to ensure proximity in the replication log.

Thus, illustrative embodiments using the transactional VSAM log new unique transaction identifier information records that bracket start and end of in-flight units of recovery. In addition, the transactional VSAM of illustrative embodiments log the task control block address of each transaction record to correlate to the new unique transaction identifier information record. The replication server of illustrative embodiments tracks beginning of each respective unique transaction identifier information record, which includes the unit of recovery identifier, as in-flight with a look-up indexed list to correlate the unit of recovery identifier with job name, step, and task control block address. The replication server of illustrative embodiments adds a group of transaction changes to the most recent unique transaction identifier information record, which includes the unit of recovery identifier, that the group of transaction changes matches. The replication server of illustrative embodiments either commits or rolls-back a particular in-flight unit of recovery based on a corresponding unique transaction identifier information record bracket indicating an end of that particular in-flight unit of recovery. It should be noted that changes remain in-flight indefinitely until the replication server of illustrative embodiments logs a corresponding unique transaction identifier information record with a final disposition of either commit or rollback. The replication server of illustrative embodiments selectively commits or rolls-back the unit of recovery on final disposition of the unique transaction identifier information record, which includes the unit of recovery identifier, and ends in-flight tracking for that particular unit of recovery if in-flight tracking is still active.

Thus, illustrative embodiments provide one or more technical solutions that overcome a technical problem with selectively committing or rolling-back in-flight units of recovery corresponding to transaction data changes implemented in a transactional VSAM. As a result, these one or more technical solutions provide a technical effect and practical application in the field of data replication.

With reference now to FIG. 3, a diagram illustrating an example of a transactional VSAM unit of recovery replication system is depicted in accordance with an illustrative embodiment. Transactional VSAM unit of recovery replication system 300 may be implemented in a network of data processing systems, such as network data processing system 100 in FIG. 1. Transactional VSAM unit of recovery replication system 300 is a system of hardware and software components for replicating changes to transaction data written by a transactional VSAM using a unique transaction identifier information record, which includes an identifier of an in-flight unit of recovery corresponding to a group of transaction data changes, to selectively commit or rollback the group of transaction data changes of the in-flight unit of recovery based on a commit/rollback flag contained in the unique transaction identifier information record.

In this example, transactional VSAM unit of recovery replication system 300 includes transactional VSAM server 302, replication server 304, transactional VSAM 306, client device 308, and target system 310. However, it should be noted that transactional VSAM unit of recovery replication system 300 is intended as an example only and not as a limitation on illustrative embodiments. In other words, transactional VSAM unit of recovery replication system 300 may include any number of transactional VSAM servers, replication servers, transactional VSAMs, client devices, and target systems.

Transactional VSAM server 302, replication server 304, transactional VSAM 306, and client device 308 may be, for example, server 104, server 106, storage 108, and client 110 in FIG. 1, respectively. Replication server 304 may also be data processing system 200 in FIG. 2. In addition, in an alternative illustrative embodiment, transactional VSAM server 302 can include transactional VSAM 306.

A user of client device 308 implements changes to transactions 312 stored in transactional VSAM 306 by performing at least one of an insert, update, or delete operation corresponding to a set of transactions. Transactional VSAM server 302 includes logical partition 1 (LPAR1) 314. It should be noted that transactional VSAM server 302 includes a plurality of logical partitions of server resources. In this example, LPAR1 314 runs JOBA_STEP1 316 and JOBB_STEP2 318. However, it should be noted that LPAR1 314 is intended as an example only and that a respective logical partition of transactional VSAM server 302 may run any number of job names and steps. JOBA_STEP1 316 and JOBB_STEP2 318 represent batch jobs corresponding to transaction data changes within transactional VSAM 306.

In response to LPAR1 314 running JOBA_STEP1 316 and JOBB_STEP2 318, transactional VSAM 320 writes a transactional VSAM (TVSAM) log block for LPAR1 314 to replication log 322 of replication server 304. In this example, the TVSAM log block for LPAR1 314 within replication log 322 includes unique transaction identifier (UTI)_123 JOBA_STEP1, JOBA_STEP1_UPDATE, UTI_987 JOBB_STEP2, JOBB_STEP2 INSERT, JOBA_STEP1_DELETE, JOBB_STEP2_COMMIT 324, UTI_987 JOBB_STEP2, JOBA_STEP1_COMMIT 326, and UTI_123 JOBA_STEP1.

It should be noted that replication server 304 ignores JOBB_STEP2_COMMIT 324 and JOBA_STEP1_COMMIT 326 when reading replication log 322 because replication server 304 is performing in-flight tracking 328 of unit of recovery 330 and unit of recovery 332, which correspond to the transaction data changes of JOBA_STEP1 316 and JOBB_STEP2 318 processed by LPAR1 314. For example, unit of recovery 330 includes LPAR1_UTI_123_UPDATE and LPAR1_UTI_123_DELETE. Similarly, unit of recovery 332 includes LPAR1_UTI_987_INSERT and LPAR1_UTI_987_UPDATE.

In response to in-flight tracking 328 receiving an indication of an end of unit of recovery 330 and unit of recovery 332, replication server 304 reads a commit/rollback flag contained in an information record corresponding to UTI_123 and a commit/rollback flag contained in an information record corresponding to UTI_987. Based on the commit/rollback flag of a respective UTI information record, replication server 304 selectively commits or rolls-back unit of recovery 330 and unit of recovery 332. If replication server 304 commits unit of recovery 330 and/or unit of recovery 332, then replication server sends the committed unit of recovery to target system 310. Target system 310 may be, for example, a transactional VSAM identical to transactional VSAM 306, a message queue, a heterogeneous database system, an immutable datastore, or the like. In addition, target system 310 may represent a set of target systems.

Figure 4:
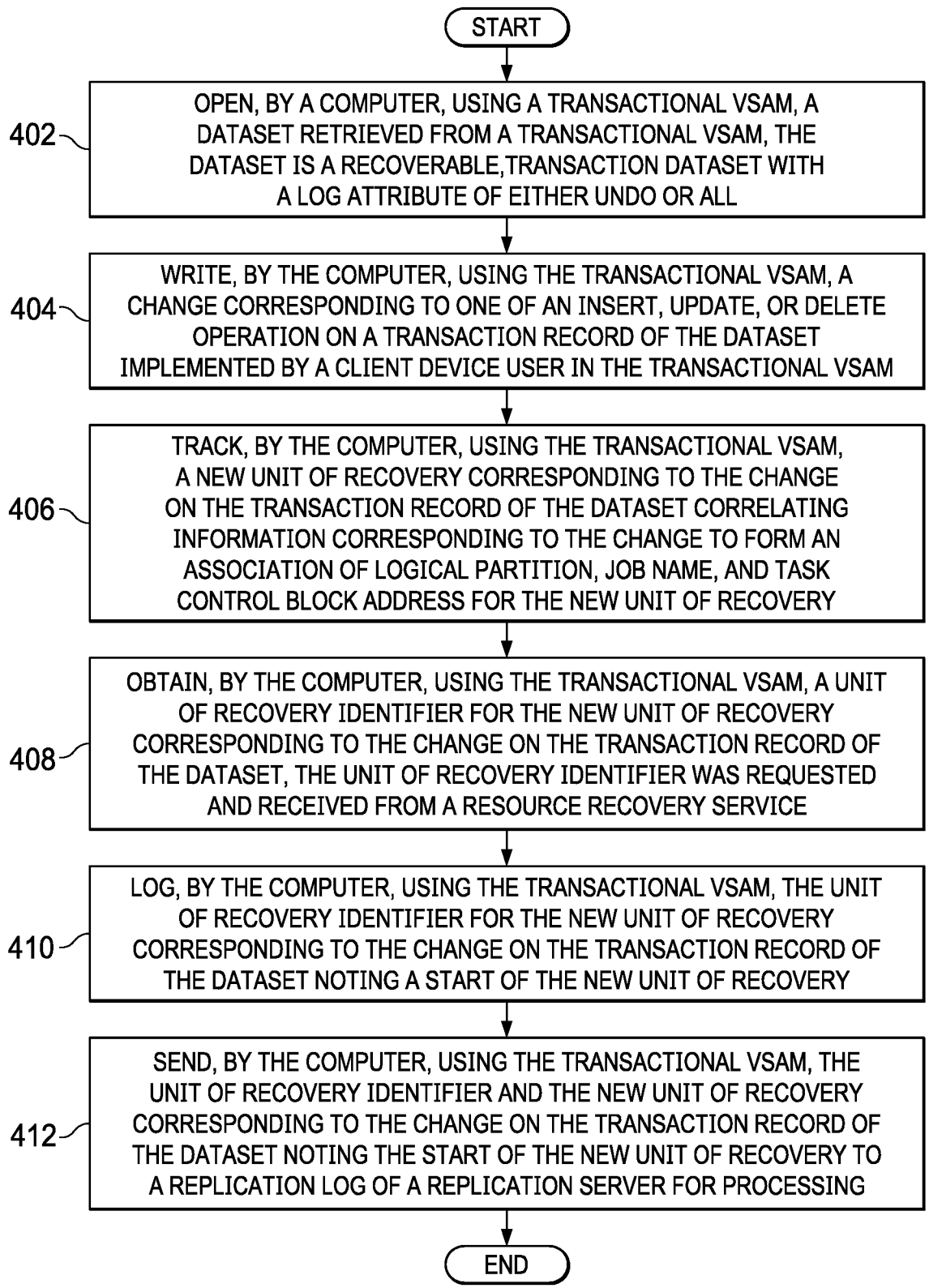
FIG. 4 is a flowchart illustrating a process for sending a new unit of recovery corresponding to a transaction record change noting a start of the new unit of recovery to a replication log in accordance with an illustrative embodiment.

With reference now to FIG. 4, a flowchart illustrating a process for sending a new unit of recovery corresponding to a transaction record change noting a start of the new unit of recovery to a replication log is shown in accordance with an illustrative embodiment. The process shown in FIG. 4 may be implemented in a computer, such as, for example, server 104 or server 106 in FIG. 1 or transactional VSAM server 302 in FIG. 3.

The process begins when the computer, using a transactional VSAM, opens a dataset retrieved from a transactional VSAM (step 402). The dataset is a recoverable, transaction dataset with a log attribute of either UNDO or ALL. The computer, using the transactional VSAM, writes a change corresponding to one of an insert, update, or delete operation on a transaction record of the dataset implemented by a client device user in the transactional VSAM (step 404).

The computer, using the transactional VSAM, tracks a new unit of recovery corresponding to the change on the transaction record of the dataset correlating information corresponding to the change to form an association of logical partition, job name, and task control block address for the new unit of recovery (step 406). In addition, the computer, using the transactional VSAM, obtains a unit of recovery identifier for the new unit of recovery corresponding to the change on the transaction record of the dataset (step 408). The unit of recovery identifier was requested and received from a resource recovery service.

The computer, using the transactional VSAM, logs the unit of recovery identifier for the new unit of recovery corresponding to the change on the transaction record of the dataset noting a start of the new unit of recovery (step 410). Further, the computer, using the transactional VSAM, sends the unit of recovery identifier and the new unit of recovery corresponding to the change on the transaction record of the dataset noting the start of the new unit of recovery to a replication log of a replication server for processing (step 412). Thereafter, the process terminates.

Figure 5:
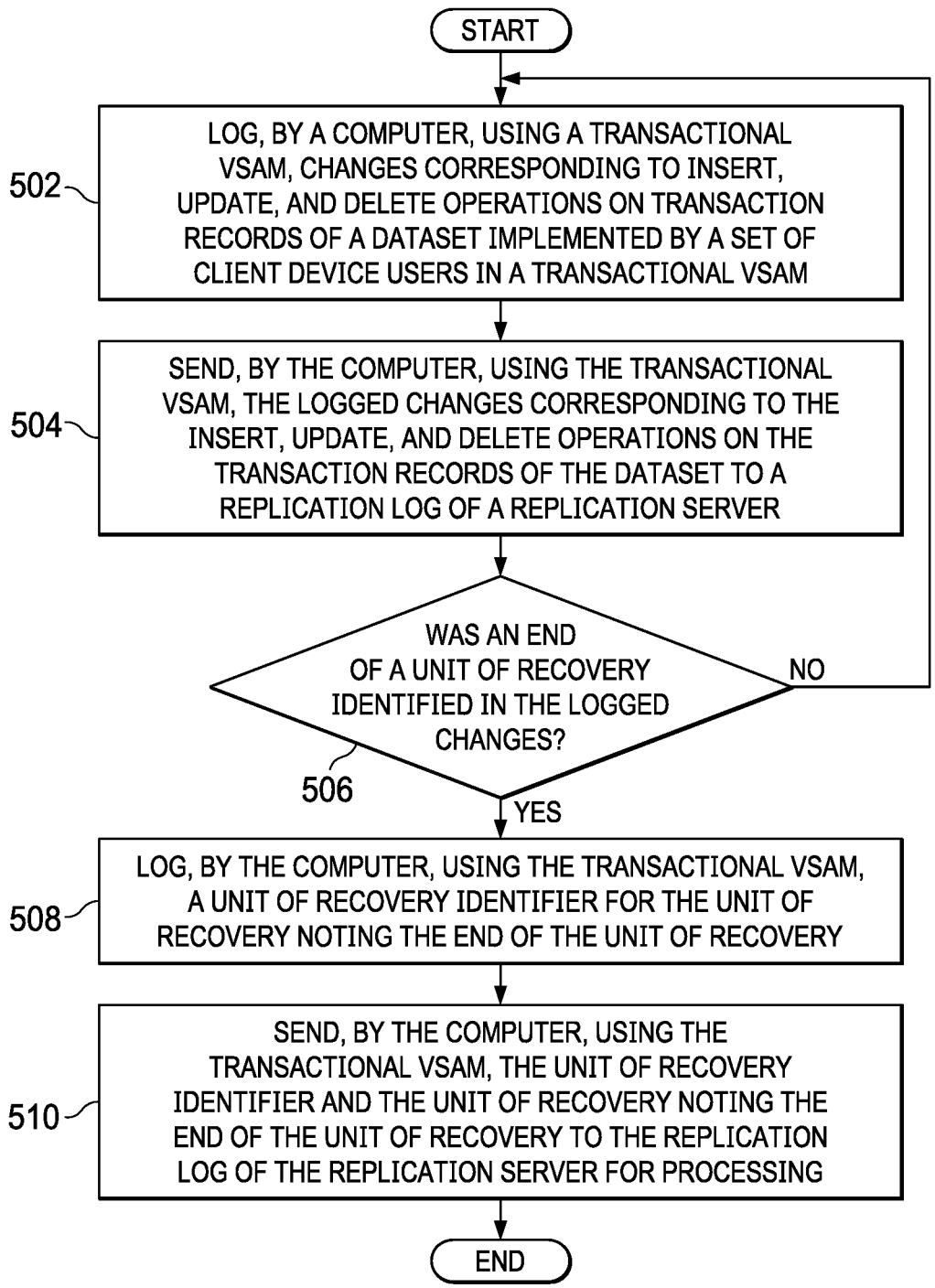
FIG. 5 is a flowchart illustrating a process for sending a unit of recovery noting an end of the unit of recovery to a replication log in accordance with an illustrative embodiment.

With reference now to FIG. 5, a flowchart illustrating a process for sending a unit of recovery noting an end of the unit of recovery to a replication log is shown in accordance with an illustrative embodiment. The process shown in FIG. 5 may be implemented in a computer, such as, for example, server 104 or server 106 in FIG. 1 or transactional VSAM server 302 in FIG. 3.

The process begins when the computer, using a transactional VSAM, logs changes corresponding to insert, update, and delete operations on transaction records of a dataset implemented by a set of client device users in a transactional VSAM (step 502). The computer, using the transactional VSAM, sends the logged changes corresponding to the insert, update, and delete operations on the transaction records of the dataset to a replication log of a replication server (step 504). In addition, the computer makes a determination as to whether an end of a unit of recovery was identified in the logged changes (step 506).

If the computer determines that an end of a unit of recovery was not identified in the logged changes, no output of step 506, then the process returns to step 502 where the computer, using the transactional VSAM, logs more changes. If the computer determines that an end of a unit of recovery was identified in the logged changes, yes output of step 506, then the computer, using the transactional VSAM, logs a unit of recovery identifier for the unit of recovery noting the end of the unit of recovery (step 508). Further, the computer, using the transactional VSAM, sends the unit of recovery identifier and the unit of recovery noting the end of the unit of recovery to the replication log of the replication server for processing (step 510). Thereafter, the process terminates.

Figure 6A:
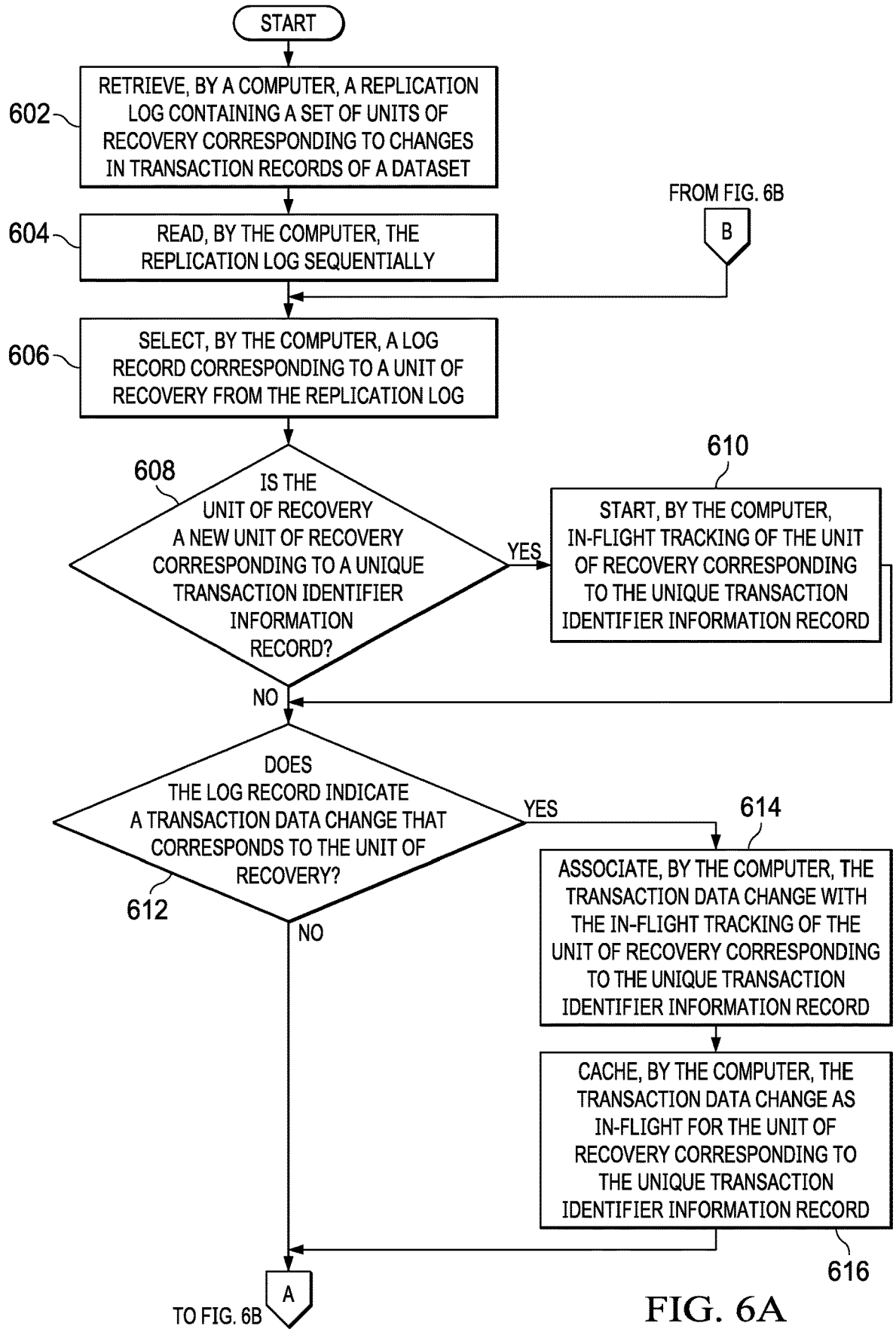
FIGS. 6A-6B are a flowchart illustrating a process for selectively committing or rolling-back a unit of recovery in accordance with an illustrative embodiment.
Figure 6B:
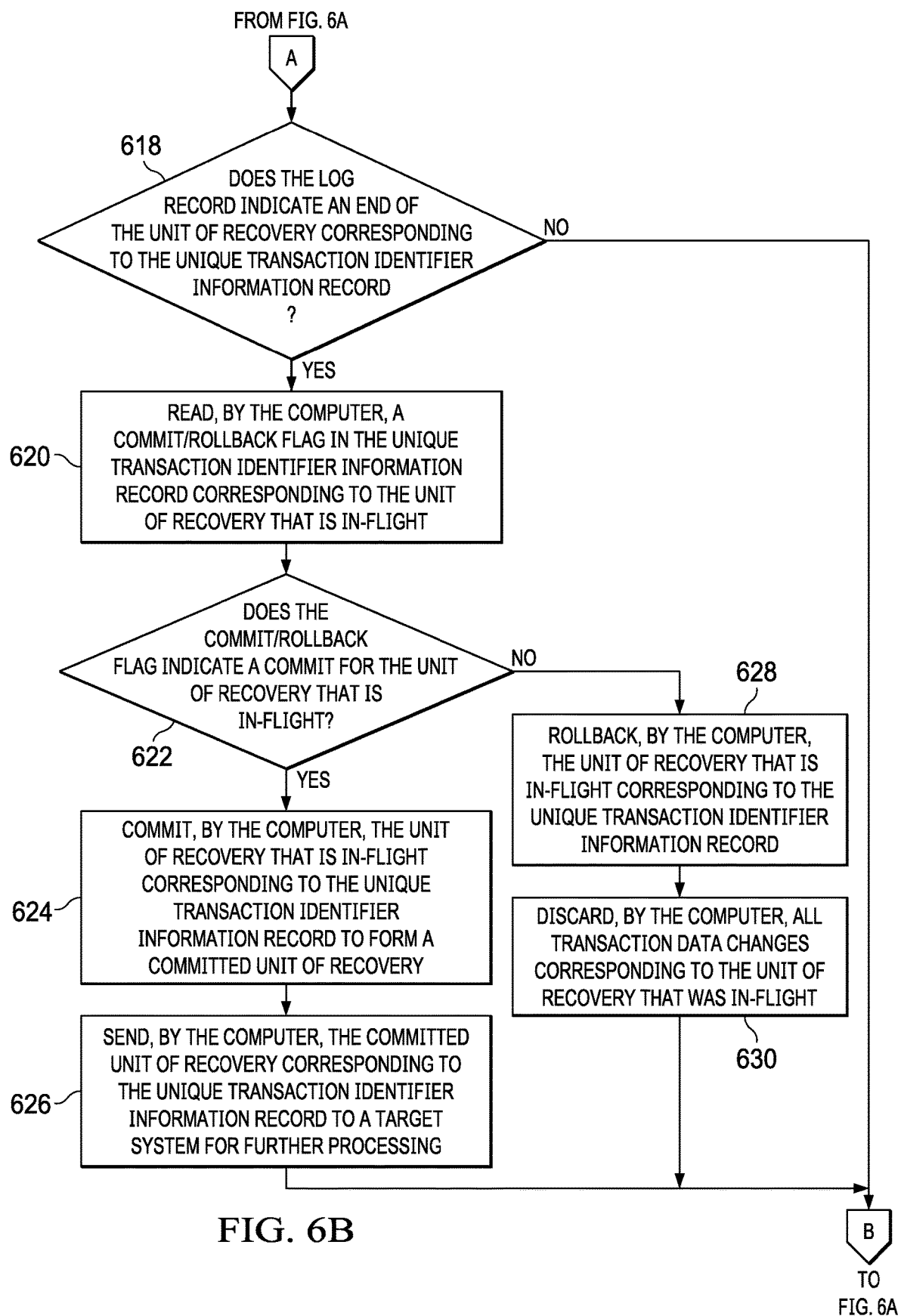

With reference now to FIGS. 6A-6B, a flowchart illustrating a process for selectively committing or rolling-back a unit of recovery is shown in accordance with an illustrative embodiment. The process shown in FIGS. 6A-6B may be implemented in a computer, such as, for example, server 106 in FIG. 1, data processing system 200 in FIG. 2, or replication server 304 in FIG. 3. For example, the process shown in FIGS. 6A-6B may be implemented in unit of recovery replication manager 218 in FIG. 2.

The process begins when the computer retrieves a replication log containing a set of units of recovery corresponding to changes in transaction records of a dataset (step 602). The computer reads the replication log sequentially (step 604). The computer selects a log record corresponding to a unit of recovery from the replication log in a sequential order (step 606). The computer makes a determination as to whether the unit of recovery is a new unit of recovery corresponding to a unique transaction identifier information record (step 608).

If the computer determines that the unit of recovery is a new unit of recovery corresponding to a unique transaction identifier information record, yes output of step 608, then the computer starts in-flight tracking of the unit of recovery corresponding to the unique transaction identifier information record (step 610). Thereafter, the process proceeds to step 612. If the computer determines that the unit of recovery is not a new unit of recovery (i.e., a previously existing unit of recovery) corresponding to a unique transaction identifier information record, no output of step 608, then the computer makes a determination as to whether the log record indicates a transaction data change that corresponds to the unit of recovery (step 612).

If the computer determines that the log record does indicate a transaction data change that corresponds to the unit of recovery, yes output of step 612, then the computer associates the transaction data change with the in-flight tracking of the unit of recovery corresponding to the unique transaction identifier information record (step 614). In addition, the computer caches the transaction data change as in-flight for the unit of recovery corresponding to the unique transaction identifier information record (step 616). Thereafter, the process proceeds to step 618.

Returning again to step 612, if the computer determines that the log record does not indicate a transaction data change that corresponds to the unit of recovery, no output of step 612, then the computer makes a determination as to whether the log record indicates an end of the unit of recovery corresponding to the unique transaction identifier information record (step 618). If the computer determines that the log record does not indicate an end of the unit of recovery corresponding to the unique transaction identifier information record, no output of step 618, then the process returns to step 606 where the computer sequentially selects a next log record from the replication log. If the computer determines that the log record does indicate the end of the unit of recovery corresponding to the unique transaction identifier information record, yes output of step 618, then the computer reads a commit/rollback flag in the unique transaction identifier information record corresponding to the unit of recovery that is in-flight (step 620).

In response to the computer reading the commit/rollback flag, the computer makes a determination as to whether the commit/rollback flag indicates a commit for the unit of recovery that is in-flight (step 622). If the computer determines that the commit/rollback flag does indicate a commit for the unit of recovery that is in-flight, yes output of step 622, then the computer commits the unit of recovery that is in-flight corresponding to the unique transaction identifier information record to form a committed unit of recovery (step 624). Further, the computer sends the committed unit of recovery corresponding to the unique transaction identifier information record to a target system for failure recovery (step 626). Thereafter, the process returns to step 606 where the computer sequentially selects a next log record from the replication log.

Returning again to step 622, if the computer determines that the commit/rollback flag does not indicate a commit for the unit of recovery that is in-flight, no output of step 622, then the computer rolls-back the unit of recovery that is in-flight corresponding to the unique transaction identifier information record (step 628). Furthermore, the computer discards all transaction data changes corresponding to the unit of recovery that was in-flight (step 630). Thereafter, the process returns to step 606 where the computer sequentially selects a next log record from the replication log.

Thus, illustrative embodiments of the present invention provide a computer-implemented method, computer system, and computer program product for replicating changes to transaction data written by a transactional VSAM using a unique transaction identifier information record, which includes an identifier of an in-flight unit of recovery corresponding to a group of transaction data changes, to selectively commit or rollback the group of transaction data changes of the in-flight unit of recovery based on a commit/ rollback flag contained in the unique transaction identifier information record. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selectively committing or rolling-back in-flight units of recovery, the computer-implemented method comprising:
    reading, by a replication server operating on a computer, an indicator in a transaction identifier information record corresponding to a unit of recovery that is in-flight, wherein the transaction identifier information record and the unit of recovery are separate records within a replication log, wherein the indicator in the transaction identifier information record includes a unique identifier associated with all in-flight records of the unit of recovery, wherein the transaction identifier information record is received in the replication server from a transaction server communicatively coupled with the replication server, wherein the transaction server implements a transactional virtual storage access method;
    determining, by the replication server, whether the indicator indicates a commit for the unit of recovery that is in-flight;
    responsive to the replication server determining that the indicator does indicate the commit for the unit of recovery that is in-flight, selecting, by the replication server, all in-flight records associated with the unique identifier in the transaction identifier information record to form selected in-flight records;
    responsive to the replication server selecting all in-flight records associated with the unique identifier in the transaction identifier information record, committing, by the replication server, the unit of recovery that is in-flight corresponding to the unique identifier in the transaction identifier information record to form a committed unit of recovery, wherein the committed unit of recovery comprises all selected in-flight records;
    sending, by the replication server, the committed unit of recovery corresponding to the transaction identifier information record to a target system for further processing;
    writing, by the transaction server, using the transactional virtual storage access method, a change corresponding to an operation on a transaction record of a dataset of the replication log;
    tracking, by the transaction server, using the transactional virtual storage access method, the unit of recovery corresponding to the change on the transaction record of the dataset of the replication log correlating information corresponding to the change to form an association of logical partition, job name, and task control block address for the unit of recovery;
    obtaining, by the transaction server, using the transactional virtual storage access method, a unique unit of recovery identifier for the unit of recovery corresponding to the change on the transaction record of the dataset of the replication log;
    logging, by the transaction server, using the transactional virtual storage access method, the unique unit of recovery identifier for the unit of recovery corresponding to the change on the transaction record of the dataset of the replication log; and
    sending, by the transaction server, using the transactional virtual storage access method, the unique unit of recovery identifier and the unit of recovery to the replication log of the transaction server for processing.

2. The computer-implemented method of claim 1 further comprising:
    responsive to the replication server determining that the indicator does not indicate the commit for the unit of recovery that is in-flight, selecting all in-flight records associated with the unique identifier in the transaction identifier information record;
    responsive to the replication server selecting all in-flight records associated with the unique identifier in the transaction identifier information record, rolling-back, by the replication server, the in-flight records associated with the unique identifier of the unit of recovery that is in-flight corresponding to the transaction identifier information record; and
    discarding, by the replication server, transaction data changes corresponding to the unit of recovery that was in-flight.

3. The computer-implemented method of claim 1 further comprising:
    retrieving, by the replication server, the replication log containing a set of units of recovery corresponding to changes in transaction records of a dataset;
    reading, by the replication server, the replication log sequentially; and
    selecting, by the replication server, a log record corresponding to the unit of recovery from the replication log.

4. The computer-implemented method of claim 3 further comprising:
    determining, by the replication server, whether the log record indicates an end of the unit of recovery corresponding to the transaction identifier information record; and
    responsive to the replication server determining that the log record does indicate the end of the unit of recovery corresponding to the transaction identifier information record, reading, by the replication server, the indicator in the transaction identifier information record corresponding to the unit of recovery that is in-flight.

5. The computer-implemented method of claim 3 further comprising:
    determining, by the replication server, whether the unit of recovery is a new unit of recovery corresponding to the transaction identifier information record;
    responsive to the replication server determining that the unit of recovery is a new unit of recovery corresponding to the transaction identifier information record, starting, by the replication server, in-flight tracking of the unit of recovery corresponding to the transaction identifier information record; and
    responsive to the replication server determining that the unit of recovery is not a new unit of recovery corresponding to the transaction identifier information record, determining, by the replication server, whether the log record indicates a transaction data change that corresponds to the unit of recovery.

6. The computer-implemented method of claim 5 further comprising:
responsive to the replication server determining that the log record does indicate a transaction data change that corresponds to the unit of recovery, associating, by the replication server, the transaction data change with the in-flight tracking of the unit of recovery corresponding to the transaction identifier information record; and
caching, by the replication server, the transaction data change as in-flight for the unit of recovery corresponding to the transaction identifier information record.

7. The computer-implemented method of claim 1, wherein the replication server uses the transaction identifier information record to relate transaction changes to the unit of recovery since the transaction identifier information record correlates logical partition, job name, and task control block address to an identifier of the unit of recovery and track the unit of recovery while in-flight not having a final disposition.

8. The computer-implemented method of claim 1, wherein the unit of recovery is a group of transaction changes corresponding to a most recent transaction identifier information record that the group of transaction changes matches marking a new association for a logical partition, job name, and task control block address combination, and wherein older transaction identifier information remains in-flight until its unique commit/rollback indicator is received.

9. The computer-implemented method of claim 1, wherein the indicator is a commit/rollback flag in the transaction identifier information record.

10. A computer system for selectively committing or rolling-back in-flight units of recovery, the computer system comprising:
a bus system;
a storage device connected to the bus system, wherein the storage device stores program instructions; and
a processor connected to the bus system, wherein the processor executes the program instructions to:
read an indicator in a transaction identifier information record corresponding to a unit of recovery that is in-flight, wherein the transaction identifier information record and the unit of recovery are separate records within a replication log, wherein the indicator in the transaction identifier information record includes a unique identifier associated with all in-flight records of the unit of recovery, wherein the transaction identifier information record is received in the computer system from a transaction server communicatively coupled with the computer system, wherein the transaction server implements a transactional virtual storage access method;
determine whether the indicator indicates a commit for the unit of recovery that is in-flight,
selecting all in-flight records associated with the unique identifier in the transaction identifier information record in response to determining that the indicator does indicate the commit for the unit of recovery that is in-flight to form selected in-flight records;
commit the unit of recovery that is in-flight corresponding to the transaction identifier information record to form a committed unit of recovery in response to selecting all in-flight records associated with the unique identifier in the transaction identifier information record, wherein the committed unit of recovery comprises all selected in-flight records;
send the committed unit of recovery corresponding to the transaction identifier information record to a target system for further processing;
write using the transactional virtual storage access method, a change corresponding to an operation on a transaction record of a dataset of the replication log;
track using the transactional virtual storage access method, the unit of recovery corresponding to the change on the transaction record of the dataset of the replication log correlating information corresponding to the change to form an association of logical partition, job name, and task control block address for the unit of recovery;
obtain using the transactional virtual storage access method, a unique unit of recovery identifier for the unit of recovery corresponding to the change on the transaction record of the dataset of the replication log;
log using the transactional virtual storage access method, the unit of recovery identifier for the unique unit of recovery corresponding to the change on the transaction record of the dataset of the replication log; and
send using the transactional virtual storage access method, the unit of recovery identifier and the unique unit of recovery to the replication log of the transaction server for processing.

11. The computer system of claim 10, wherein the processor further executes the program instructions to:
rollback the unit of recovery that is in-flight corresponding to the transaction identifier information record in response to determining that the indicator does not indicate the commit for the unit of recovery that is in-flight; and
discard transaction data changes corresponding to the unit of recovery that was in-flight.

12. The computer system of claim 10, wherein the processor further executes the program instructions to:
retrieve the replication log containing a set of units of recovery corresponding to changes in transaction records of a dataset;
read the replication log sequentially; and
select a log record corresponding to the unit of recovery from the replication log.

13. The computer system of claim 12, wherein the processor further executes the program instructions to:
determine whether the log record indicates an end of the unit of recovery corresponding to the transaction identifier information record; and
read the indicator in the transaction identifier information record corresponding to the unit of recovery that is in-flight in response to determining that the log record does indicate the end of the unit of recovery corresponding to the transaction identifier information record.

14. A computer program product for selectively committing or rolling-back in-flight units of recovery, the computer program product comprising a computer-readable storage medium having program instructions embodied therewith, the program instructions executable by a replication server operating on a computer to cause the replication server to perform a method of:
reading, by the replication server, an indicator in a transaction identifier information record corresponding to a unit of recovery that is in-flight, wherein the transaction identifier information record and the unit of recovery are separate records within a replication log, wherein the indicator in the transaction identifier information record includes a unique identifier associated with all in-flight records of the unit of recovery, wherein the transaction identifier information record is received in the replication server from a transaction server communicatively coupled with the replication server, wherein the transaction server implements a transactional virtual storage access method;

determining, by the replication server, whether the indicator indicates a commit for the unit of recovery that is in-flight;

responsive to the replication server determining that the indicator does indicate the commit for the unit of recovery that is in-flight, selecting, by the replication server, all in-flight records associated with the unique identifier in the transaction identifier information record to form selected in-flight records;

responsive to the replication server selecting all in-flight records associated with the unique identifier in the transaction identifier information record, committing, by the replication server, the unit of recovery that is in-flight corresponding to the unique identifier in the transaction identifier information record to form a committed unit of recovery, wherein the committed unit of recovery comprises all selected in-flight records;

sending, by the replication server, the committed unit of recovery corresponding to the transaction identifier information record to a target system for further processing;

writing, by the transaction server, using the transactional virtual storage access method, a change corresponding to an operation on a transaction record of a dataset of the replication log;

tracking, by the transaction server, using the transactional virtual storage access method, the unit of recovery corresponding to the change on the transaction record of the dataset of the replication log correlating information corresponding to the change to form an association of logical partition, job name, and task control block address for the unit of recovery;

obtaining, by the transaction server, using the transactional virtual storage access method, a unique unit of recovery identifier for the unit of recovery corresponding to the change on the transaction record of the dataset of the replication log;

logging, by the transaction server, using the transactional virtual storage access method, the unique unit of recovery identifier for the unit of recovery corresponding to the change on the transaction record of the dataset of the replication log; and sending, by the transaction server, using the transactional virtual storage access method, the unique unit of recovery identifier and the unit of recovery to the replication log of the transaction server for processing.

15. The computer program product of claim 14 further comprising:

responsive to the replication server determining that the indicator does not indicate the commit for the unit of recovery that is in-flight, rolling-back, by the replication server, the unit of recovery that is in-flight corresponding to the transaction identifier information record; and discarding, by the replication server, transaction data changes corresponding to the unit of recovery that was in-flight.

16. The computer program product of claim 14 further comprising:

retrieving, by the replication server, the replication log containing a set of units of recovery corresponding to changes in transaction records of a dataset;

reading, by the replication server, the replication log sequentially; and selecting, by the replication server, a log record corresponding to the unit of recovery from the replication log.

17. The computer program product of claim 16 further comprising:

determining, by the replication server, whether the log record indicates an end of the unit of recovery corresponding to the transaction identifier information record; and responsive to the replication server determining that the log record does indicate the end of the unit of recovery corresponding to the transaction identifier information record, reading, by the computer, the indicator in the transaction identifier information record corresponding to the unit of recovery that is in-flight.

18. The computer program product of claim 16 further comprising:

determining, by the replication server, whether the unit of recovery is a new unit of recovery corresponding to the transaction identifier information record;

responsive to the computer determining that the unit of recovery is a new unit of recovery corresponding to the transaction identifier information record, starting, by the replication server, in-flight tracking of the unit of recovery corresponding to the transaction identifier information record; and responsive to the replication server determining that the unit of recovery is not a new unit of recovery corresponding to the transaction identifier information record, determining, by the replication server, whether the log record indicates a transaction data change that corresponds to the unit of recovery.

19. The computer program product of claim 18 further comprising:

responsive to the replication server determining that the log record does indicate a transaction data change that corresponds to the unit of recovery, associating, by the replication server, the transaction data change with the in-flight tracking of the unit of recovery corresponding to the transaction identifier information record; and caching, by the replication server, the transaction data change as in-flight for the unit of recovery corresponding to the transaction identifier information record.

20. The computer program product of claim 14, wherein the unit of recovery is a group of transaction changes corresponding to a most recent transaction identifier information record that the group of transaction changes matches marking a new association for a logical partition, job name, and task control block address combination, and wherein older transaction identifier information remains in-flight until its unique commit/rollback indicator is received.

* * * * *